United States Patent
Zhang et al.

(10) Patent No.: US 11,864,120 B2
(45) Date of Patent: Jan. 2, 2024

(54) UPLINK SPATIAL RELATION INDICATION AND POWER CONTROL

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Fangli Xu, Beijing (CN); Haijing Hu, Beijing (CN); Haitong Sun, Irvine, CA (US); Hong He, Cupertino, CA (US); Wei Zeng, Santa Clara, CA (US); Yakun Sun, San Jose, CA (US); Yuchul Kim, Santa Clara, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 16/977,442

(22) PCT Filed: Sep. 29, 2019

(86) PCT No.: PCT/CN2019/108867
§ 371 (c)(1),
(2) Date: Sep. 1, 2020

(87) PCT Pub. No.: WO2021/056506
PCT Pub. Date: Apr. 1, 2021

(65) Prior Publication Data
US 2022/0279450 A1    Sep. 1, 2022

(51) Int. Cl.
*H04W 52/08*    (2009.01)
*H04W 52/24*    (2009.01)
(Continued)

(52) U.S. Cl.
CPC ......... *H04W 52/08* (2013.01); *H04W 52/146* (2013.01); *H04W 52/242* (2013.01); *H04W 52/367* (2013.01)

(58) Field of Classification Search
CPC . H04W 52/08; H04W 52/146; H04W 52/242; H04W 52/367; H04B 7/0404; H04B 7/0695
See application file for complete search history.

(56) References Cited

U.S. PATENT DOCUMENTS

| 2013/0094450 A1 | 4/2013 | Umesh et al. |
| 2019/0132033 A1 | 5/2019 | Akkarakaran et al. |

(Continued)

FOREIGN PATENT DOCUMENTS

| CN | 108282863 A | 7/2018 |
| WO | 2018171674 A1 | 9/2018 |

(Continued)

OTHER PUBLICATIONS

LG Electronics Feature lead summary#4 of Enhancements on Multi-beam Operations, 3GPP TSG RAN WG1 Meeting #98 R1-1909779, Aug. 30, 2019(Aug. 30, 2019) pp. 13-15.
(Continued)

*Primary Examiner* — Gary Mui
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to perform power control for uplink (UL) reference signals (RS). A UE may determine spatial configuration for UL RS based on another communication. A UE may determine an updated pathloss within a reduced implementation following an update of downlink (DL) RS. A UE may reset a power control factor in response to receiving an update.

20 Claims, 11 Drawing Sheets

(51) Int. Cl.
*H04W 52/14* (2009.01)
*H04W 52/36* (2009.01)

(56) References Cited

U.S. PATENT DOCUMENTS

| | | | |
|---|---|---|---|
| 2019/0199554 A1 | 6/2019 | Park et al. | |
| 2019/0289513 A1 | 9/2019 | Jeon et al. | |
| 2019/0373486 A1* | 12/2019 | Bai | H04L 1/0009 |
| 2020/0236574 A1* | 7/2020 | Ohuchi | H04L 5/0057 |
| 2020/0305088 A1* | 9/2020 | Nory | H04W 52/242 |
| 2020/0351892 A1* | 11/2020 | Yi | H04L 5/0044 |
| 2021/0076384 A1* | 3/2021 | MolavianJazi | H04B 17/318 |
| 2021/0084510 A1* | 3/2021 | Ryu | H04W 52/242 |
| 2021/0084596 A1* | 3/2021 | Lee | H04W 52/143 |
| 2022/0271890 A1* | 8/2022 | Grossmann | H04W 52/242 |
| 2022/0312467 A1* | 9/2022 | Matsumura | H04W 72/23 |
| 2022/0321292 A1* | 10/2022 | Matsumura | H04W 72/23 |

FOREIGN PATENT DOCUMENTS

| | | | |
|---|---|---|---|
| WO | 2019157975 | 8/2019 | |
| WO | WO-2020030117 A1 * | 2/2020 | H04W 52/42 |

OTHER PUBLICATIONS

RAN WG4 LS on clarification of UE capability for FDMed between PDSCH and CLI measurement resource, 3GPP TSG RAN WG1 #98, R1-1907979. Aug. 30, 2019(Aug. 30, 2019) p. 1.
ZTE Draft CR on identifying transmission occasion after resetting a PC closed loop, GPP TSG RAN WG1 Meeting #96, R1-1901765, Mar. 1, 2019(Mar. 1, 2019) p. 1.
International Search Report in PCT application No. PCT/CN2019/108867 dated Jun. 23, 2020, 9 pages.
Extended European Search Report for EP Patent Application No. 19946705.1; dated Apr. 28, 2023.
Qualcomm Inc. "Enhancements on Multi-beam Operation"; 3GPP TSG-RAN WG1 Meeting #98 R1-1909273; dated Apr. 26, 2019.
Office Action for CN Patent Application No. 201980100827.0; dated May 18, 2023.
Office Action for JP Patent Application No. 2022-518947; dated May 9, 2023.
Asia Pacific Telecom "Discussion on Multi-beam Operations"; 3GPP TSG RAN WG1#98 R1-1908928; Aug. 26, 2019.
Office Action for JP Patent Application No. 2022-518947; dated Aug. 21, 2023.
MediaTek Inc. "Mainteannce for Beam Management"; 3GPP TSG RAN WG1 Meeting #95 R1-1812345; Nov. 12, 2018.

* cited by examiner

- A UE resets accumulation of a for active UL BWP b of
  carrier f of serving cell c to $f_{b,f,c}(k,l)=0, k=0,1,...,I$
  - If a configuration for a corresponding $P_{O\_UE\_PUSCH,b,f,c}(j)$ value is provided by higher layers
  - If a configuration for a corresponding $\alpha_{b,f,c}(j)$ value is provided by higher layers
  - *If a configuration for a corresponding reference signal $q_d$ for pathloss measurement is provided by higher layers*
  - If $j>1$ and the PUSCH transmission is scheduled by a DCI format 0_1 that includes a SRI
    field, and the UE is provided higher SRI-PUSCH-PowerControl, the UE determines the value
    if l from the value of j based on an indication by the SRI field for a sri-PUSCH-PowerControlId
    value associated with the sri-P0-PUSCH-AlphaSetId value corresponding to j and with the
    sri-PUSCH-ClosedLoopIndex value corresponding to l
  - If $j>1$ and the PUSCH transmission is scheduled by a DCI format 0_0 or by a DCI format
    0_1 that does not include a SRI firld or the UE is not provided SRI-PUSCH-PowerControl, l=0
  - If $j=1$, l is provided by the value of powerControlLoopToUse

FIG. 13

- If a configuration for a $P_{O\_SRS,b,f,c}(q_s)$ value or for a $\alpha_{srs,b,f,c}(q_s)$ value *or for reference signal resource index $q_d$* for a corresponding SRS power control adjustment state l for active UL BWP
  b of carrier f of serving cell C is provided by higher layers
  - $h_{b,f,c}(k)=0, k=0,1,...,i$
- Else
  - $h_{b,f,c}(0) = \Delta P_{rampup,b,f,c} + \delta_{msg\,2,b,f,c}$

FIG. 14

UPLINK SPATIAL RELATION INDICATION AND POWER CONTROL

PRIORITY CLAIM

This application is a national phase entry of PCT application number PCT/CN2019/108867, entitled "Uplink Spatial Relation Indication and Power Control," filed Sep. 29, 2019, which is hereby incorporated by reference in its entirety as though fully and completely set forth herein.

TECHNICAL FIELD

The present application relates to wireless devices, and more particularly to apparatuses, systems, and methods for managing uplink spatial relation and power control.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, pathloss parameters such as the spatial relation between uplink and downlink reference signals, filtering behavior, and/or accumulative closed loop power control may be ambiguous. Accordingly, improvements in the field may be desired.

SUMMARY

Techniques, apparatuses, systems, and methods are disclosed for a user equipment device (UE) to select a beam for uplink reference signals and/or perform pathloss measurements are provided.

In some embodiments, a UE may establish a connection with a base station, determine that a spatial relation for uplink reference signals is not provided by higher layer signaling, and determine that downlink reference signals for pathloss measurement are not configured by higher layer signaling. Accordingly, the UE may select a beam for uplink reference signals using: a default beam for a downlink shared channel, a beam used for downlink reference signals, and/or quasi co-located with a scheduling downlink control channel.

In some embodiments, a UE may establish a connection with a base station and may determine that a reduced latency for pathloss measurement is in effect. The UE may select one or more pathloss parameters in response to the reduced latency, and may measure pathloss according to the parameters.

In some embodiments, a UE may establish a connection with a base station and may receive an update for downlink reference signals. In response to the update, the UE may reset a pathloss measurement.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which:

FIGS. 13 and 14 illustrate potential standards changes, according to some embodiments.

Figure 1:
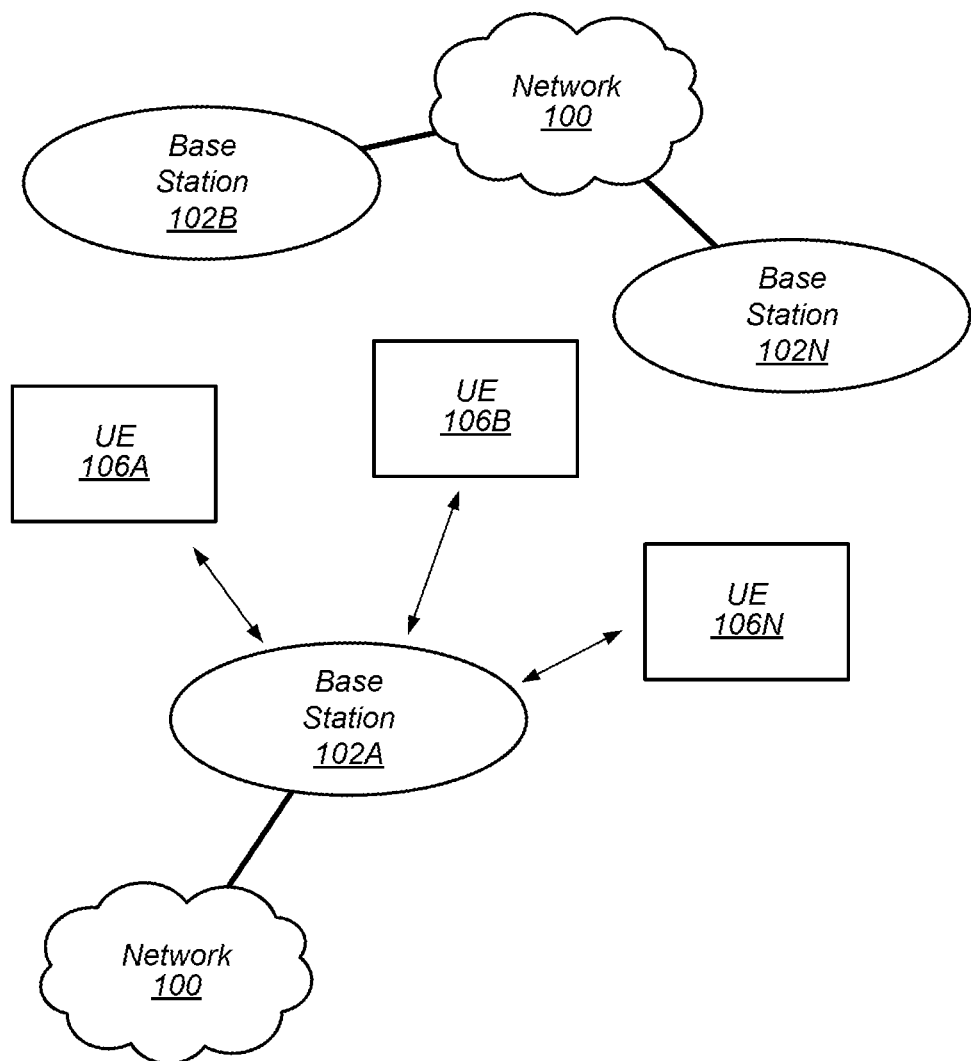
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:
UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
RS: reference signal Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
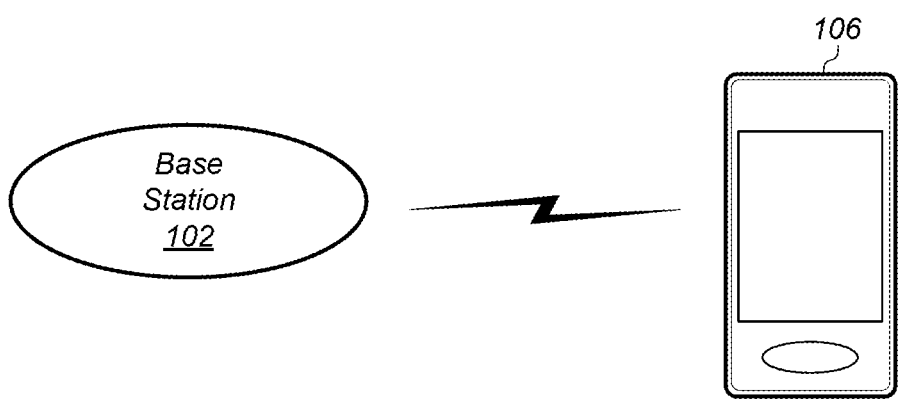
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
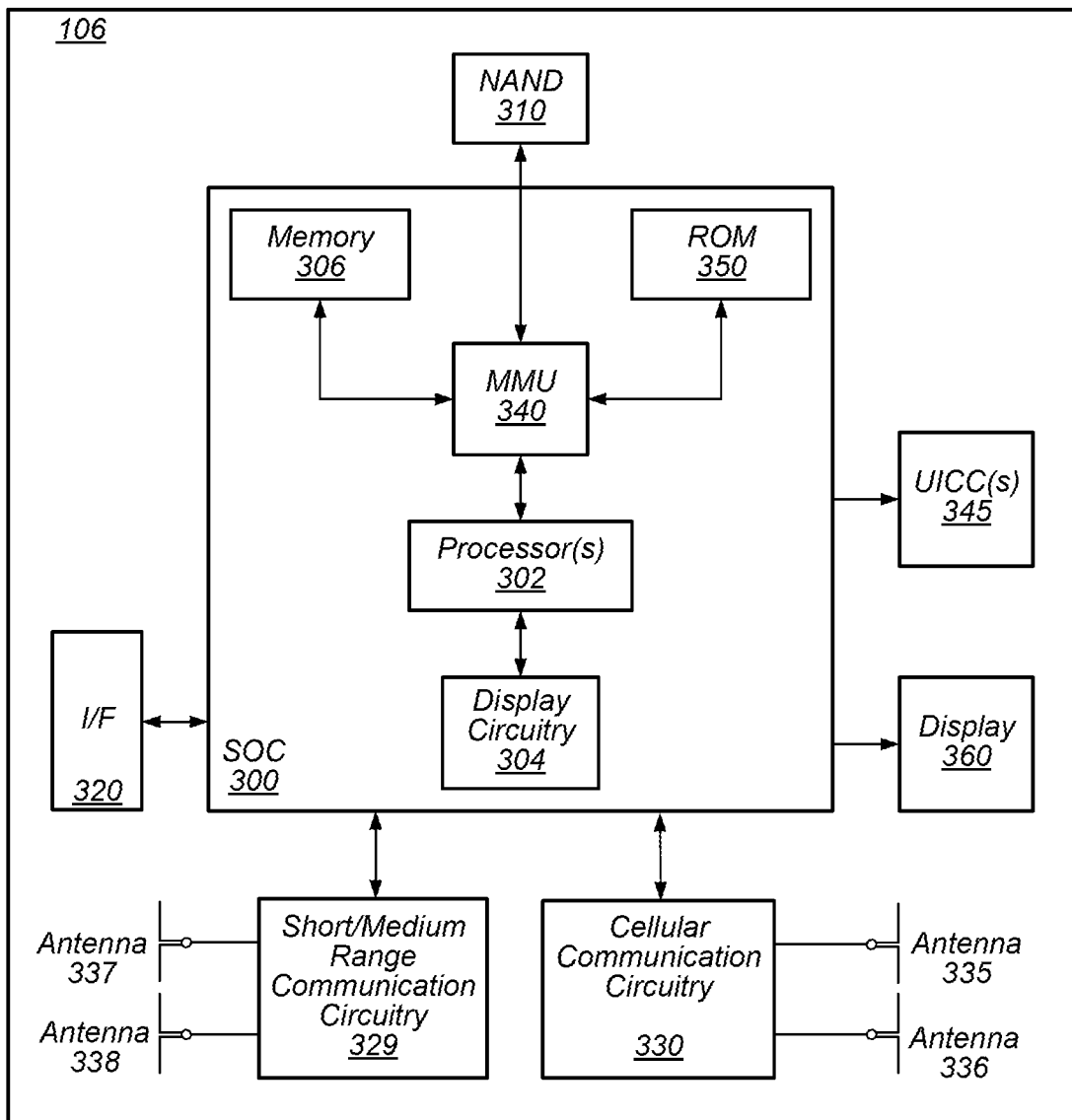
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
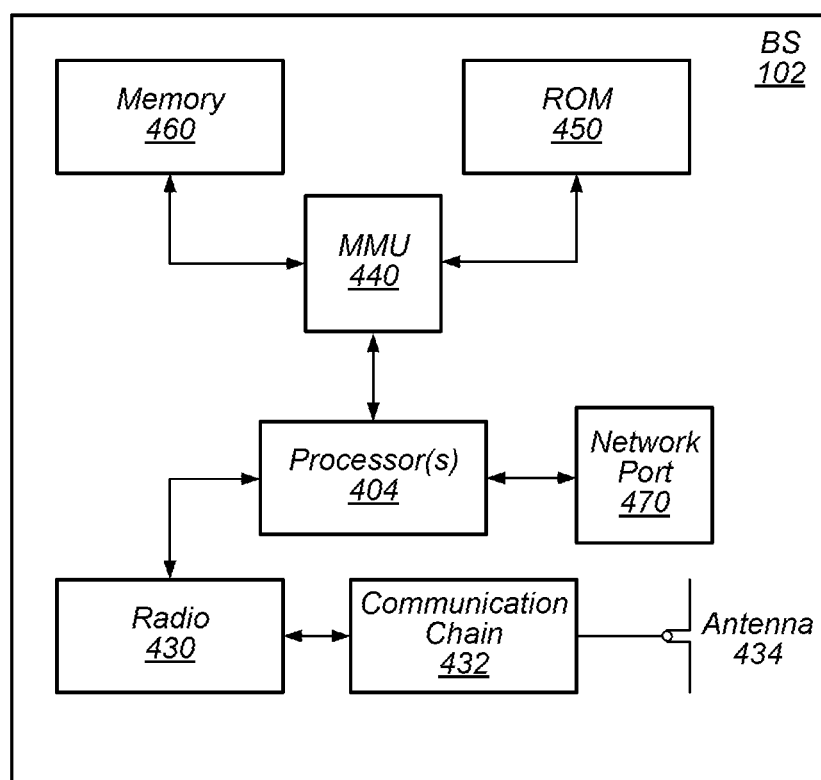
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
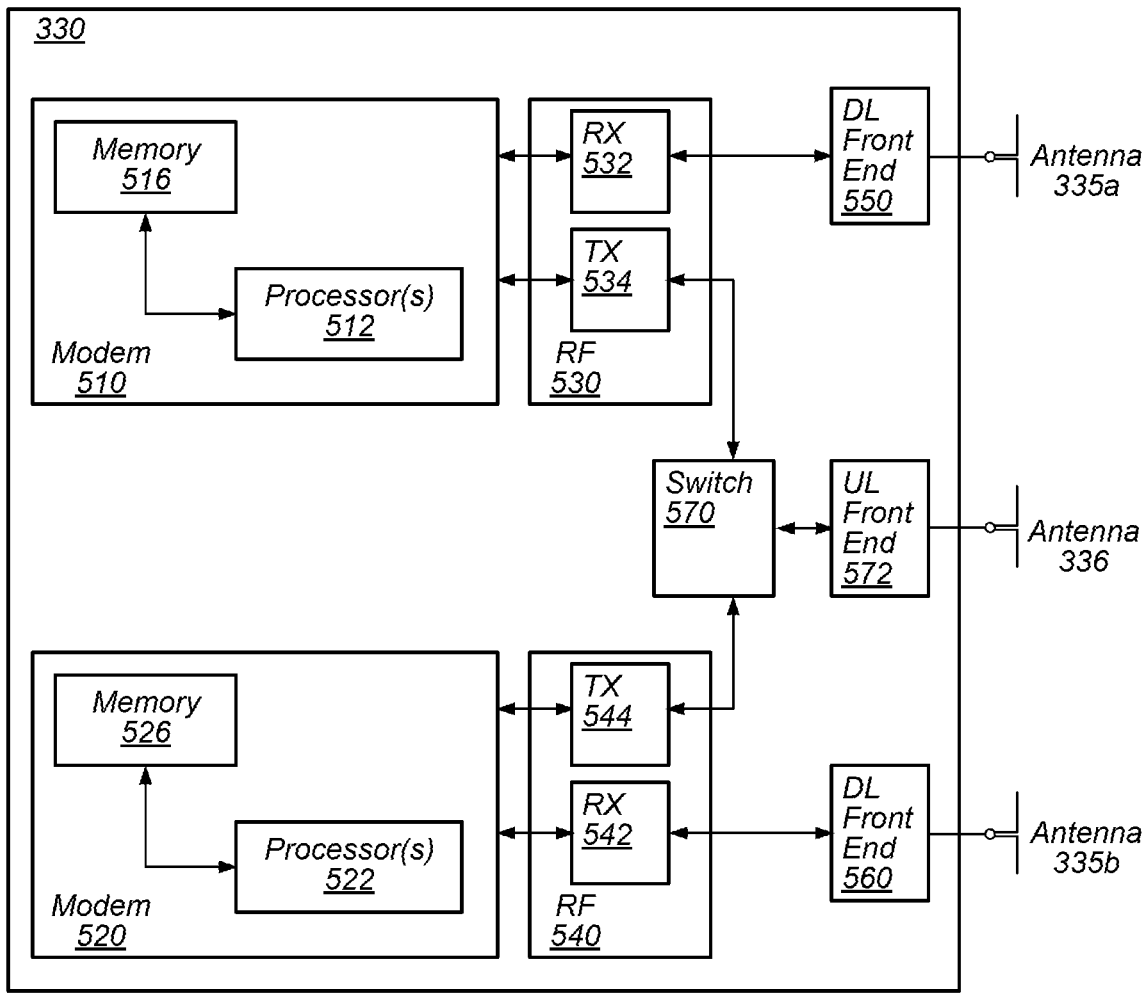
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
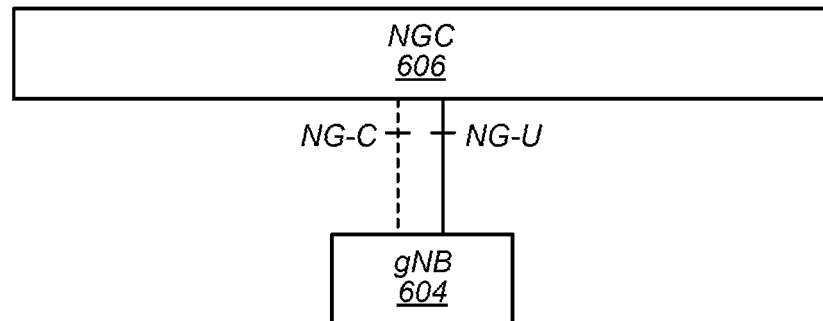
FIGS. 6 and 7 illustrate examples of a 5G NR base station (gNB), according to some embodiments.
Figure 7:
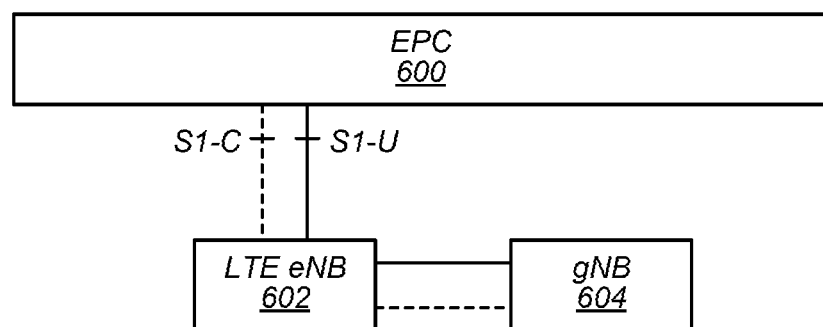

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
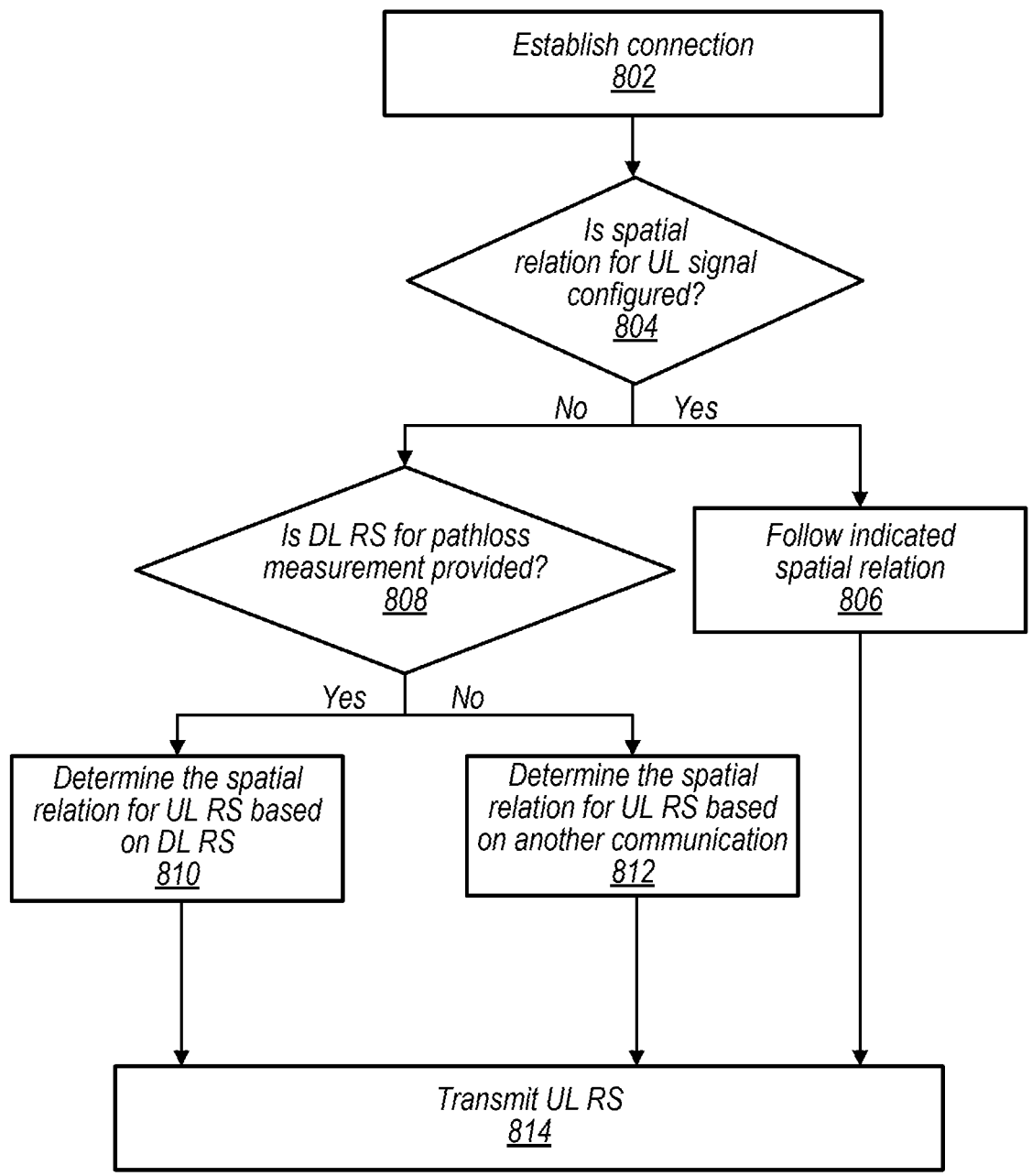
FIG. 8 is flow chart diagram illustrating an example method for beam selection, according to some embodiments.
Figure 9:
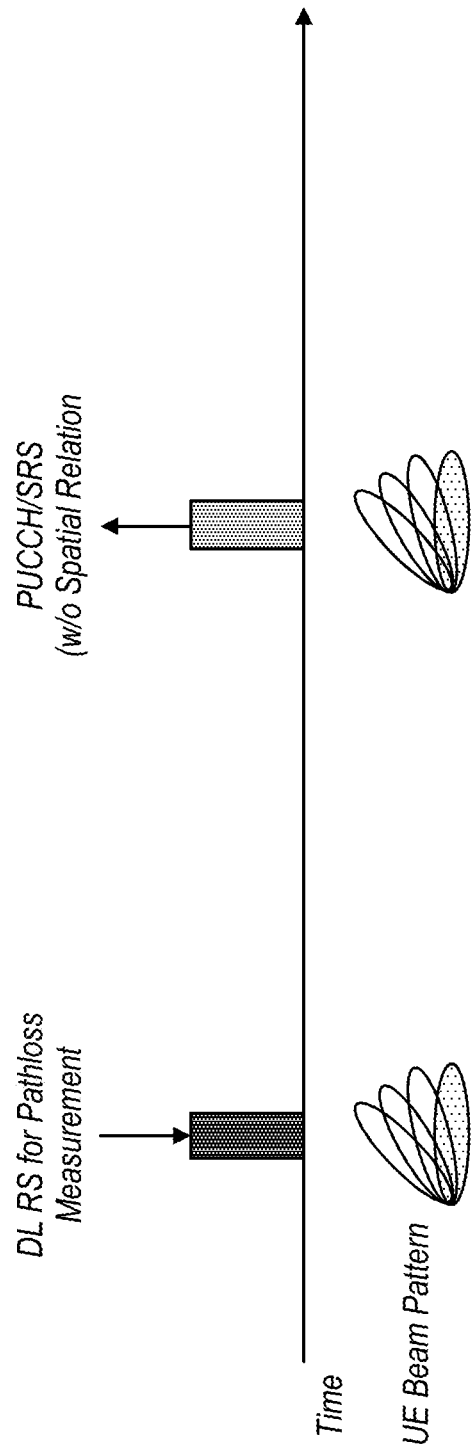
FIG. 9 is a timing diagram illustrating aspects of beam selection, according to some embodiments.

FIGS. 8 and 9—Beam Selection

Modern wireless communication systems, e.g., cellular systems such as 5G NR, may allow for a UE (e.g., UE 106) to and a base station (e.g., BS 102) to measure channel conditions in various ways. Exchanging uplink (UL) and downlink (DL) references signals (RS), such as sounding reference signals (SRS) facilitate such measurements.

The UE and/or BS may take various measurements, e.g., of a wireless link between the UE and BS. The measurements may include any radio link measurements such as signal-noise ratio (SNR), signal to interference and noise ratio (SINR), reference signal received power (RSRP), reference signal received quality (RSRQ), received signal strength indicator (RSSI), block error rate (BLER), bit error rate (BER), channel impulse response (CIR), channel error response (CER), etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values (e.g., directly and/or as channel quality indicator (CQI), channel state information (CSI), etc.), comparison results, etc. to each other and/or to the network at any time.

Among various possibilities, RSRP may be used to estimate pathloss. For example, pathloss may be determined based on a ratio of RSRP to the transmit power (e.g., of the RS). In other words, RSRP may be inversely proportional to pathloss.

In 3GPP release 16, overhead and latency reduction schemes are planned to be specified, and the following aspects may be considered for further study: 1) the spatial relation assumption for dedicated physical uplink control channel (PUCCH) and SRS when a spatial relation is not provided by higher layer signaling, and 2) latency reduction for pathloss power control parameter update, e.g., DL RS for pathloss measurement, and parameters P0 and alpha, e.g., which may be updated by media access control (MAC) control element (CE).

FIG. 8 is a flow diagram which illustrates exemplary aspects of beam selection for transmission of UL RS. The techniques of FIG. 8 may allow for a UE to select a beam (or beams) for transmitting RS without an indication of a spatial relation from the network. Aspects of the method of FIG. 8 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Similarly, while at least some elements of the method are described in a manner relating to transmission of UL RS, such description is not intended to be limiting to the disclosure, and aspects of the method may be used for transmission of other types of signals such as data and/or control information, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a BS 102 (802), according to some embodiments. The connection may be or include a cellular connection, e.g., operating according to one or more wireless standards, e.g., NR. The UE and BS may exchange data and/or control information, e.g., in the uplink (UL) and/or downlink (DL) directions.

The BS may provide control information to the UE related to transmission and/or reception of RS. For example, the BS may indicate either or both of a receive beam that the UE should use to receive DL RS or a transmit beam that the UE should use to transmit UL RS. The receive and transmit beams may or may not correspond (e.g., they may be the same or they may be different). In some embodiments, the BS may indicate that the UE should use more than one beam for transmission and/or reception of RS. For example, the BS may indicate that the UE should transmit or receive RS with a plurality of different beams (e.g., including a quasi-omni beam and/or one or more focused beams, among various possibilities). A beam may be indicated by and/or referred to as a spatial domain filter, spatial relation, or antenna weight vector, etc.

The control information may include information related to handling updates to DL RS for pathloss measurement. Note that pathloss measurement may refer to the process of measuring RSRP (e.g., and/or another indicator of signal strength) and using RSRP to estimate pathloss. For example, the BS may indicate to the UE what level (e.g., level 1 and/or level 3, etc.) should be used to measure pathloss (e.g., for purposes of power control) following an update to DL RS. Similarly, the UE may indicate to the BS its capability for responding to such an update, e.g., how much time it may take to update a pathloss measurement process. Further, the BS may indicate parameters for filtering pathloss, e.g., a forgetting factor. The BS may indicate one or more timer values, e.g., for measuring RSRP using level 1 and/or level 3 following such an update.

The UE 106 may determine whether a spatial relation (e.g., beam) for a UL signal is configured (804), according to some embodiments. The UL signal may be UL RS (e.g., SRS), a UL control channel (e.g., PUCCH), a UL data channel (e.g., PUSCH), and/or any other UL transmission. For example, the UE may determine whether the network (e.g., BS 102) has provided an indication of what beam (or beams) the UE should use to transmit UL RS, e.g., SRS.

If the spatial relation for UL RS is configured, the UE 106 may select a beam for UL RS according to the spatial relation (806), according to some embodiments. In other words, the UE may select a beam or beams as indicated by the network.

If the spatial relation for UL RS is not configured, the UE 106 may determine whether DL RS for pathloss measurement are provided, (808), according to some embodiments. In other words, the UE may determine if the BS 102 is transmitting DL RS for use in UL power control, e.g., for the UE to determine pathloss and adjust UL transmit power accordingly.

If DL RS is provided, the UE may be able to identify a beam based on the DL RS. For example, the UE may determine which receive beam receives the DL RS with the strongest (e.g., or otherwise best) reception (e.g., highest RSRP).

In some embodiments, the UE may determine whether the network has provided an indication of what receive beam the UE should use to receive DL RS, e.g., for purposes of measuring pathloss. If so, the UE may determine what beam is indicated.

If DL RS for pathloss is provided, the UE 106 may determine the spatial filter (e.g., beam) for UL RS based on the DL RS (e.g., for pathloss measurement) (810), according to some embodiments. In other words, when the spatial relation for dedicated PUCCH/SRS is not configured, the UE may be able to derive the spatial domain filter (e.g., select a beam) based on the DL RS. For example, the UE may apply the same spatial domain filter (e.g., beam) to transmit PUCCH/SRS as that used to receive DL RS, e.g., as shown in FIG. 9, according to some embodiments.

The beam(s) used to receive DL RS may be indicated by the BS to the UE using higher layer (e.g., radio resource control (RRC) signaling. Further, if the beam(s) used for receiving DL RS is not indicated by higher layer signaling, the UE may determine the beam(s) to receive DL RS (e.g., for pathloss measurement) based on the beam used to receive synchronization signal block (SSB). In other words, the UE may use the same beam(s) to receive DL RS pathloss measurement as for receiving SSB. The UE may determine how and when to decode SSB based on a master information block (MIB).

If DL RS for pathloss is not configured, the UE 106 may determine the spatial filter (e.g., beam) for UL RS based on a beam used for another communication (812), according to some embodiments. In other words, the UE may select a spatial filter for UL RS based on a spatial filter used for a communication other than UL RS or DL RS. For example, the UE 106 may select a spatial filter according to one or more of the following options.

In some embodiments, the UE may determine the spatial domain filter (e.g., beam) of UL RS (e.g., dedicated PUCCH/SRS, such as semi-persistent and/or periodic SRS) based on a default downlink beam, e.g., a default beam for physical downlink shared channel (PDSCH). It will be appreciated that other downlink channels may be used (e.g., a default beam for physical downlink control channel (PDCCH)).

The default PDSCH beam may be based on quasi co-location (QCL) of a monitored control resource set (CORESET). For example, a CORESET of a latest slot before a current slot (e.g., using an offset parameter, K) may be used if multiple CORESETs are configured. For example, if PUCCH/SRS is (e.g., to be) transmitted in slot n, the CORESET used for PDSCH in an earlier slot n-K may be selected for transmitting UL RS in slot n. The offset parameter K may be configured by higher layer signaling, may be predefined (e.g. K=0, or any other value), or may be determined based on UE capability (e.g., K may be based on a minimum amount of time or number of slots for the UE to switch beams). Further, for different subcarrier spacing, K may be the same or different (e.g., K may depend on subcarrier spacing, according to some embodiments). For example, different subcarrier spacing may be associated with different slot lengths (e.g., for 15 kHz subcarrier spacing, the slot duration may be 1 ms, but for 30 kHz subcarrier spacing, slot duration may be 0.5 ms). Thus, in order to achieve a same time offset in different subcarrier spacing scenarios, the value of the slot offset parameter K may differ.

In another example, K may be determined based on $N_2$, e.g., as shown in Table 6.4-1 and Table 6.4-2 of 3GPP Technical Specification 38.214, reproduced below.

TABLE 6.4-1

| | PUSCH preparation time for PUSCH timing capability 1 |
|---|---|
| μ | PUSCH preparation time $N_2$ [symbols] |
| 0 | 10 |
| 1 | 12 |

TABLE 6.4-1-continued

| | PUSCH preparation time for PUSCH timing capability 1 |
|---|---|
| μ | PUSCH preparation time $N_2$ [symbols] |
| 2 | 23 |
| 3 | 36 |

TABLE 6.4-2

| | PUSCH preparation time for PUSCH timing capability 2 |
|---|---|
| μ | PUSCH preparation time $N_2$ [symbols] |
| 0 | 5 |
| 1 | 5.5 |
| 2 | 11 for frequency range 1 |

In the event that multiple CORESETs are used in slot n-K, the UE may select the CORESET (e.g., used in slot n-K) with the lowest CORESET ID. In some embodiments, the CORESET with the highest CORESET ID or another CORESET as indicated by the network may be selected.

In some embodiments, the UE may determine the spatial domain filter (e.g., beam) of UL RS (e.g., dedicated PUCCH/SRS, such as semi-persistent and/or periodic SRS) based on DL RS in one active transmission configuration indication (TCI) state for PDSCH (e.g., or PDCCH, etc.). TCI may be a means of the BS indicating a beam (e.g., for UL transmissions) to the UE. Further, the spatial domain for UL RS may be determined based on QCL of a CORESET indicated by a TCI. In some embodiments, the CORESET may be in an active bandwidth part (BWP) in the same component carrier (CC) as the UL RS. Among various possibilities, the CORESET may be the one with highest CORESET ID, may be the one with lowest CORESET ID, and/or may be indicated by the network, e.g., using higher layer signaling. If multiple TCI states are configured, the UE may base the determination on the first TCI or the last (e.g., most recently configured) TCI, among various possibilities. As described above, the PUCCH/SRS in slot n should be based on the corresponding TCI state in slot n-K. K may be determined as discussed above.

In some embodiments, the UE may determine the spatial domain filter (e.g., beam) of UL RS (e.g., dedicated aperiodic PUCCH/SRS) based on QCL of a DL channel, e.g., a scheduling PDCCH. In some embodiments, the scheduling PDCCH and (e.g., aperiodic) PUCCH/SRS may be in the same CC or in different CCs in the same band. In some embodiments, for cross-carrier scheduling, or cross-carrier scheduling for CCs in different bands, either spatial relation or DL RS for pathloss measurement may be configured.

In some embodiments, in order to determine the spatial domain filter, the UE may consider the type of UL RS to be transmitted. For aperiodic UL RS (e.g., PUCCH/SRS), the beam may be chosen based on QCL of a DL channel. Note that aperiodic UL RS may be triggered by the network, e.g., via PDCCH from the BS. Accordingly, the UE may be able to use the beam to transmit the UL RS as to receive the DL signal. Thus, beam switching may be reduced by using the same beam to receive PDCCH and to transmit UL RS. For other types of UL RS, e.g. semi-persistent/periodic PUCCH/SRS, a default DL beam or TCI may be used, among various possibilities.

The UE 106 may transmit UL signals (e.g., UL RS, among various possibilities) using the selected beam(s) (814), according to some embodiments.

In some embodiments, the UL RS may be aperiodic. In some embodiments, the UL RS may be periodic. In some embodiments, the UE may transmit aperiodic RS using a beam (or beams) chosen based on QCL of a DL channel and/or may transmit periodic or semi-persistent RS using a beam (or beams) chosen based on TCI and/or a default DL beam.

In some embodiments, the techniques of FIG. 8 may be applied to SRS for pathloss measurement, e.g., and may not apply to SRS for beam management. In other embodiments, the techniques of FIG. 8 may be applied to SRS for pathloss measurement and/or SRS for beam management.

Figure 10:
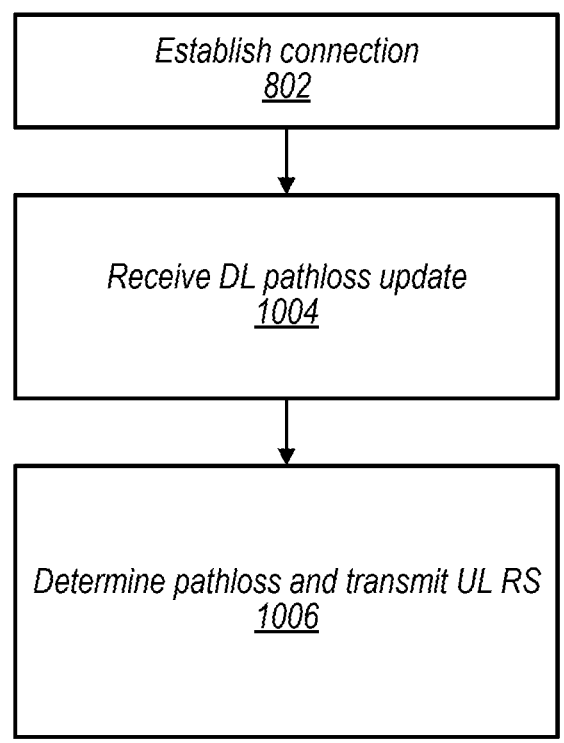
FIG. 10 is flow chart diagram illustrating an example method for determining pathloss parameters with reduced latency, according to some embodiments.

FIG. 10—Pathloss Measurement and Power Control with Reduced Latency

When the latency (e.g., available amount of time) for a power control parameter update is reduced (e.g., below a threshold amount of time), the UE behavior on pathloss measurement and/or transmit power for transmission of UL RS may be ambiguous, according to some embodiments. In 3GPP release 15, the pathloss is measured, e.g., at time n, based on a higher layer filtered (e.g., calculated over time, e.g., a weighted average with most weight given to a mast recent value) RSRP, which may be calculated by equation 1:

$$F_n = (1-a)F_{n-1} + aM_n$$

Where $F_{n-1}$ is the filtered RSRP determined at a previous time n−1, $M_n$ is a currently measured RSRP, and a is a coefficient (e.g., a forgetting factor) based on higher layer (e.g., RRC) signaling.

FIG. 10 is a flow diagram which illustrates exemplary aspects of calculating pathloss with reduced latency, e.g., following an update in a DL RS for pathloss measurement. The techniques of FIG. 10 may allow for a UE to adapt or modify the calculation of pathloss, e.g., in response to an update in DL RS with a reduced latency for DL RS pathloss measurement. In some embodiments, aspects of the method of FIG. 10 may be applicable to open-loop power control techniques. Aspects of the method of FIG. 10 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a BS 102 (e.g., as described above regarding 802), according to some embodiments.

The UE 106 may receive DL RS from the BS 102 and may perform pathloss measurement based on the DL RS. For example, the UE may determine pathloss based on RSRP, e.g., measured based on DL RS. In some embodiments, the UE may determine the RSRP at a higher layer (e.g., layer 3, e.g., L3-RSRP). In some embodiments, the pathloss measurement may be used for open-loop power control.

The UE 106 may receive an update for DL RS for measuring pathloss (1004), according to some embodiments. The update may be received as (e.g., or included in) a MAC CE transmitted from the BS 102, among various possibilities. Transmitting such an update by MAC CE may reduce the latency of the update, e.g., relative to transmitting a similar update using higher layer signaling such as RRC. In other words, the update may provide reduced time for the UE to implement (e.g., respond to) the update (e.g., in comparison to a similar update provided by RRC). Thus, the UE may have relatively tight time constraints in order to implement the update. The update may change one or more parameters of the DL RS, such as transmit power, transmit beam of the BS, receive beam of the UE, and/or time and/or frequency resources, etc. Another example may be that the BS may change the DL RS to be monitored for pathloss measurement, e.g. from a first synchronization signal block (SSB) to a second SSB, e.g., from SSB1 to SSB2, or vice versa, etc.

The UE 106 may determine pathloss and transmit UL RS according to the determined pathloss (1006), according to some embodiments. In other words, the UE may measure pathloss based on DL RS according to the update, and may use the measured pathloss for power control, e.g., to determine transmit power for UL RS.

In some embodiments, the UE may measure pathloss based on an RSRP evaluated at layer 1 (e.g., L1-RSRP). For example, the UE may measure RSRP at a physical layer. An L1-RSRP may be determined quickly, e.g., relative to L3-RSRP. For example, an L1 RSRP may be based on physical layer measurements without filtering (e.g., averaging over time as in equation 1). In some embodiments, whether the pathloss is measured by L1-RSRP and/or L3-RSRP (e.g., a higher layer filtered RSRP) may be determined based on a UE capability (e.g., based on how quickly the UE may be able to respond to the update). For example, the UE capability could be whether or not the UE would track the new DL RS prior to the time it is indicated as pathloss reference signal. For example, the BS may configure 16 different DL RS (e.g., by RRC layer). A first one of the 16 different DL RS (e.g., RS1) may be initially selected (e.g., by the BS) as a pathloss RS. At a later time, the BS may decide to change the pathloss RS from RS1 to a different DL RS (e.g., RS2). If the UE can track (e.g., at the same time) each of the 16 DL RS, it may be able to use L3-RSRP, e.g., even with limited time to change from the first pathloss RS to a second pathloss RS. However, if the UE can (e.g., or does not) not track all of the configured DL RS, the UE may use L1-RSRP (e.g., for a period of time) if the RS is changed with limited implementation time (e.g., based on MAC CE).

In some embodiments, the UE may signal its capability (e.g., to track a plurality of configured DL RS or otherwise rapidly respond to a change in pathloss RS) to the BS, e.g., using RRC signaling. In some embodiments, whether the pathloss may be measured by L1-RSRP or L3-RSRP may be configured by higher layer signaling, e.g., by the network (e.g., BS 102) and/or by the UE 106. In some embodiments, if L3-RSRP is configured, the BS may not use MAC CE to update the DL RS for pathloss measurement, e.g., and may instead use RRC.

In some embodiments, the UE may measure pathloss based on L3-RSRP and the filter may be reset after (e.g., in response to) the DL RS for pathloss measurement for PUSCH/SRS power control is updated, e.g., by MAC CE. For example, L3-RSRP may be filtered using equation 1 as discussed above. For a first RSRP calculation after the DL RS update, the value of the forgetting factor, a, may be set to 1, e.g., so that the first RSRP calculation is based on the first measurement. This calculation may be expressed as in equation 2:

$$F_n = M_n$$

After the first RSRP calculation after the update (e.g., for the second and later RSRP calculations), the value of the forgetting factor, a, may be returned to a configured value and equation 1 may be used.

Figure 11:
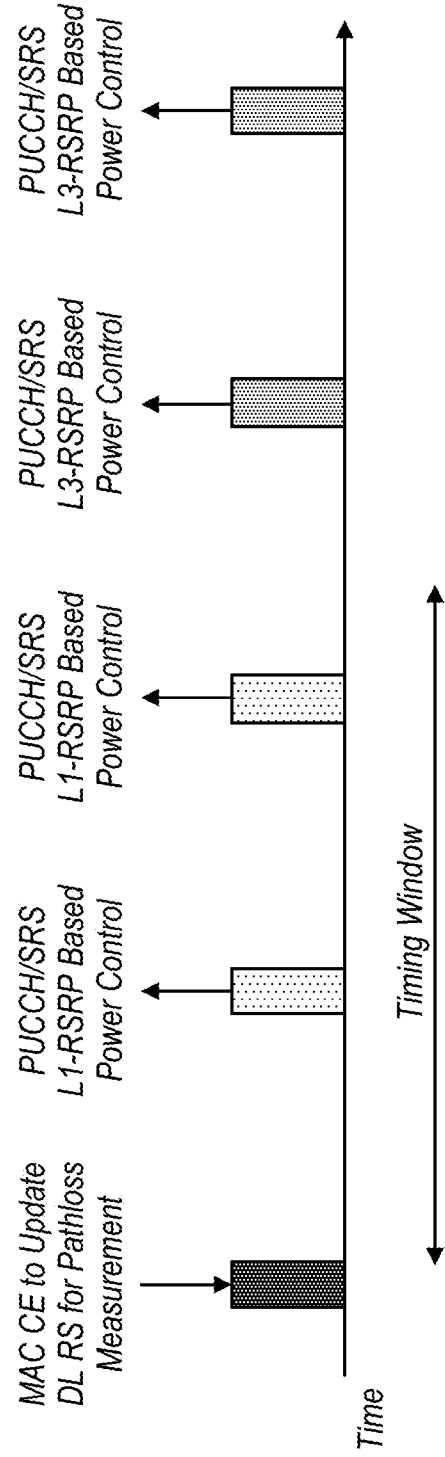
FIG. 11 is a timing diagram illustrating aspects of pathloss measurement with reduced latency, according to some embodiments.

In some embodiments, the UE may measure pathloss based on L1-RSRP after receiving the update to DL RS for pathloss measurement for a period of time (e.g., before a timer expires), e.g., as shown in FIG. 11, according to some embodiments. In other words, based on receiving the update (e.g., a MAC CE, e.g., in 1004) the UE may start (e.g., or reset) a timer. While the timer is running (e.g., during timing window 1102), the UE may use L1-RSRP for determining pathloss and for power control for transmitting UL RS. After expiration of the timer, the UE may use L3-RSRP. The timer (e.g., the length of time for which L1-RSRP is used) may be configured by higher layer signaling (e.g., RRC), according to some embodiments. Such RRC signaling may be responsive to an indication from the UE of its capability related to L1 and/or L3 RSRP measurements.

In some embodiments, the UE may determine a method for measuring pathloss based on the latency of the configuration update. For example, if the configuration update is received via MAC CE, e.g., with a relatively low latency, the UE may select a method for measuring pathloss that can be implemented/updated quickly. For example, the UE may choose to measure pathloss using L1-RSRP (e.g., for at least a period of time) following an update via MAC CE. In contrast, if the configuration update has a longer latency (e.g., is received via RRC), the UE may select a pathloss measurement approach with a longer latency (e.g., continuing to use L3-RSRP). In these examples, latency may be considered relative to UE capability, according to some embodiments. For example, a UE that can respond more quickly to an update may use L3-RSRP in response to an update with less latency than a UE that responds more slowly. Similarly, the length of time that L1-RSRP may be used may be based on UE capability. For example, the UE may (e.g., via RRC) indicate to the network its capability for adapting L3 measurements, and the value of a timer (e.g., associated with L1 measurements) may be set (e.g., by RRC signaling from the network) based on the capability.

Figure 12:
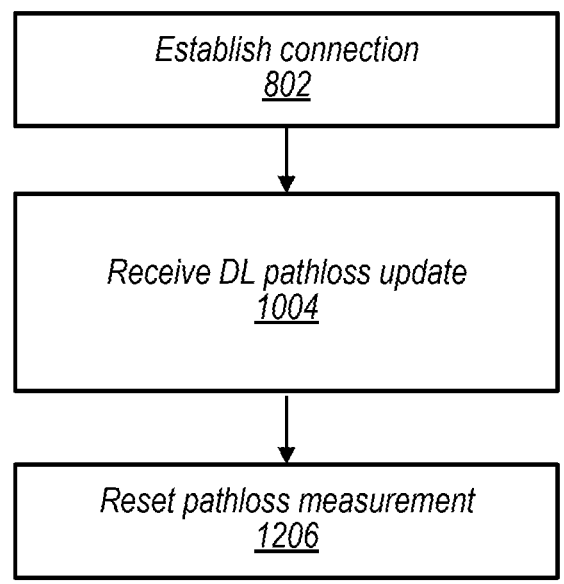
FIG. 12 is flow chart diagram illustrating an example method for pathloss measurement with updated downlink reference signals, according to some embodiments.

FIG. 12—Pathloss Measurement with Updated DL RS

FIG. 12 is a flow diagram which illustrates exemplary aspects of managing accumulative closed-loop power control behavior, e.g., following a DL RS update. The techniques of FIG. 12 may allow for a UE to efficiently reset pathloss measurement and power control following such an update. Aspects of the method of FIG. 12 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish a connection with a BS 102 (e.g., as described above regarding 802), according to some embodiments.

The UE 106 may receive DL RS from the BS 102 and may perform pathloss measurement based on the DL RS. For example, the UE may determine pathloss based on RSRP, e.g., measured based on DL RS. In some embodiments, the UE may maintain an accumulative closed-loop power control factor. For example, the pathloss measurement may be used for closed-loop power control.

The UE 106 may receive an update for DL RS (e.g., as described above regarding 1004), according to some embodiments.

In response to the update, the UE 106 may reset pathloss measurement and/or reset one or more pathloss parameters (1206), according to some embodiments. For example, if the DL RS for pathloss measurement for PUSCH/SRS is updated by MAC CE, the UE may reset an accumulative closed-loop power control factor (e.g., delta or δ). In some embodiments, the power control factor may be reset after the UE takes action to update the DL RS for pathloss measurement. In other words, the power control factor may be reset when the UE starts to perform power control based on the newly indicated reference signal, according to some embodiments.

In some embodiments, a specification change may be made for section 7.1.1 in 3GPP TS 38.213 v.15.6.0, e.g., as shown in FIG. 13. As shown, the UE may reset accumulation of a power control adjustment state (e.g., l, e.g., for PUSCH) for an active BWP (e.g., b) in response to a change in RS configuration. The power control adjustment state may be used to determine the transmit power used for UL RS transmission. For example, the accumulative power control factor may be 3 dB before it gets reset (e.g., in 1206). In other words, prior to the reset, the transmission power used by the UE for UL RS may be based on the open loop power+3 dB. After the accumulative power control factor is reset, it (e.g., delta) may equal to 0 dB. Then transmission power is the open loop power (e.g., +0 dB). The BS may use transmit power control (TPC) command signaling to change the accumulative power control factor (e.g., delta), but it may start from 0 dB.

The changed RS configuration may be provided by a higher layer (e.g., by a MAC layer of the UE, e.g., in response to a MAC CE with the update).

In some embodiments, a specification change may be made for section 7.3.1 in 3GPP TS 38.213 v.15.6.0, e.g., as shown in FIG. 14. The UE may reset accumulation of a power control adjustment state (e.g., l, e.g., for SRS) for an active BWP (e.g., b) in response to a change in configuration for SRS.

The UE may transmit one or more UL RS, e.g., using the reset pathloss parameters. For example, the UE may use the reset power control adjustment state for power control.

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
establish a connection with a cellular network;
determine that a spatial filter for an uplink signal is not configured by the cellular network;
determine that downlink reference signals for pathloss are not provided by the cellular network;
in response to the determinations that the spatial filter for the uplink signal is not configured and that downlink reference signals for pathloss are not provided, select a particular spatial filter for the uplink signal based on a beam used for a second communication; and
transmit the uplink signal using the particular spatial filter.

2. The apparatus of claim 1, wherein the second another communication is a downlink shared channel.

3. The apparatus of claim 2, wherein the particular spatial filter is selected based on a control resource set used for the downlink shared channel in a recent slot.

4. The apparatus of claim 3, wherein the recent slot is offset by K slots from a current slot and wherein K is configured by higher layer signaling.

5. The apparatus of claim 2, wherein the particular spatial filter is selected based on a control resource set of an active transmission configuration indication.

6. The apparatus of claim 5, wherein the particular spatial filter is selected based on the active transmission configuration indication used in a recent slot offset by K slots from a current slot and wherein K is determined based on a capability of the UE.

7. The apparatus of claim 1, wherein the uplink signal comprises uplink reference signals which are aperiodic, wherein the second communication is a downlink control channel.

8. A method, comprising:
establishing a connection with a cellular network;
determining that a spatial filter for an uplink signal is not configured by the cellular network;
determining that downlink reference signals for pathloss are not provided by the cellular network;
in response to the determinations that the spatial filter for the uplink signal is not configured and that downlink reference signals for pathloss are not provided, selecting a particular spatial filter for the uplink signal based on a beam used for a second communication; and
transmitting the uplink signal using the particular spatial filter.

9. The method of claim 8, wherein the second communication is a downlink shared channel.

10. The method of claim 9, wherein the particular spatial filter is selected based on a control resource set used for the downlink shared channel in a recent slot.

11. The method of claim 10, wherein the recent slot is offset by K slots from a current slot and wherein K is configured by higher layer signaling.

12. The method of claim 8, wherein the particular spatial filter is selected based on a control resource set of an active transmission configuration indication.

13. The method of claim 8, wherein the uplink signal comprises uplink reference signals which are aperiodic, wherein the second communication is a downlink control channel.

14. A method, comprising:
establishing a connection with a user equipment (UE);
determining that a spatial filter for an uplink signal is not configured for the UE;

determining that downlink reference signals for pathloss are not provided for the UE;

in response to the determinations that the spatial filter for the uplink signal is not configured for the UE and that downlink reference signals for pathloss are not provided for the UE, determining a particular spatial filter for the uplink signal based on a beam used for a second communication; and receiving the uplink signal according to the particular spatial filter.

15. The method of claim 14, wherein the second communication is a downlink shared channel.

16. The method of claim 15, wherein the particular spatial filter is determined based on a control resource set used for the downlink shared channel in a recent slot.

17. The method of claim 16, wherein the recent slot is offset by K slots from a current slot and wherein K is configured by higher layer signaling.

18. The method of claim 14, wherein the particular spatial filter is determined based on a control resource set of an active transmission configuration indication.

19. The method of claim 18, wherein the particular spatial filter is determined based on the active transmission configuration indication used in a recent slot offset by K slots from a current slot and wherein K is determined based on a capability of the UE.

20. The method of claim 14, wherein the uplink signal comprises uplink reference signals which are aperiodic, wherein the second communication is a downlink control channel.

* * * * *